March 22, 1955
G. H. PAGE
2,704,545
APPARATUS FOR THE SUSPENSION STORAGE
OF SHEETS, AND TRANSFER APPARATUS
Filed May 23, 1950
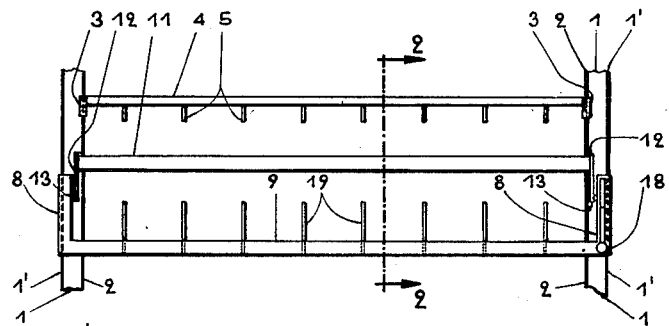
Fig. 1
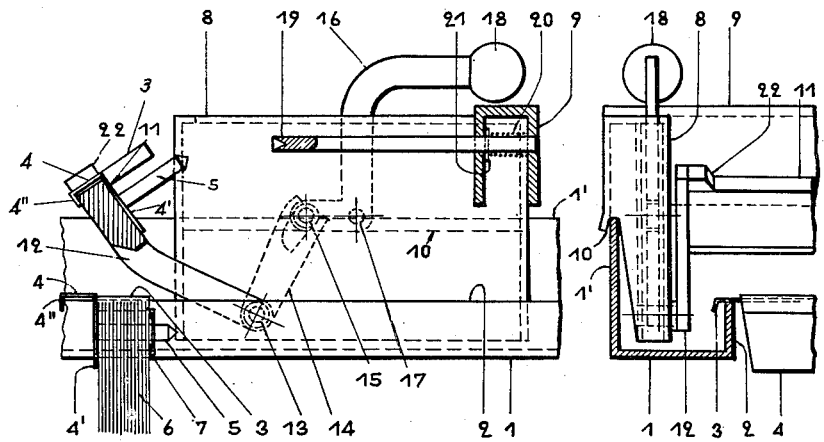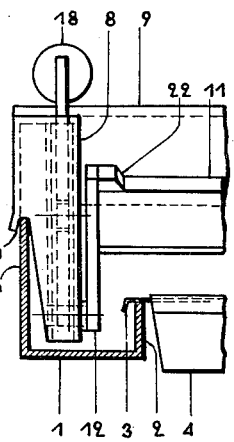
Fig. 2        Fig. 3
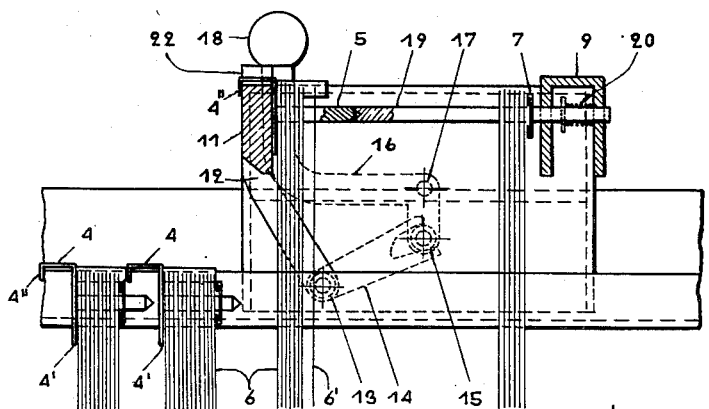
Fig. 4
Inventor:-
George Hugh Page,
by Pierce, Scheffler + Parker,
Attorneys.

United States Patent Office 2,704,545
Patented Mar. 22, 1955

2,704,545

APPARATUS FOR THE SUSPENSION STORAGE OF SHEETS, AND TRANSFER APPARATUS

George Hugh Page, Geneva, Switzerland

Application May 23, 1950, Serial No. 163,583

Claims priority, application Switzerland June 29, 1949

9 Claims. (Cl. 129—1)

This invention relates to apparatus for the hanging storage of large maps, drawings and plans on the pins of rack bars, and more particularly to storage apparatus including a transfer carriage to which a selected rack bar may be lifted when a sheet is to be withdrawn from or returned to that rack bar, the transfer carriage having pins complementary to the rack bar pins for receiving and supporting a group of the sheets when a sheet is to be withdrawn from or inserted at an intermediate point in the file of suspended sheets.

Storage apparatus of this general type is described and claimed in my copending application Serial No. 120,588, filed October 10, 1949, now Patent No. 2,623,526, and the present invention relates to improvements in mechanical constructions and arrangements of parts which simplify the operations and preclude the inadvertent displacement of sheets from a rack bar file when the latter is open on the transfer carriage.

Objects of the invention are to provide storage apparatus of the type stated in which the transfer carriage includes horizontally arranged supporting pins complementary to the supporting pins of the rack bars, an angularly movable frame to which a selected rack bar may be lifted and there supported with its pins extending obliquely upwards, and a manually operable lever for rocking the frame to bring the pins of the rack bar into butt engagement with the pins of the transfer carriage, whereby some of the file of sheets may be moved to pins of the transfer carriage to afford access to a desired intermediate portion of the file. Objects are to provide, in storage apparatus of the type stated, rack bars with pins for the suspended storage of large sheets, and a transfer carriage with horizontally arranged pins complementary to the pins of the rack bars and an angularly movable frame to which a selected rack bar may be lifted; the frame having guide portions which position the rack bar for proper alinement of the sets of pins when the frame is rocked to move the rack bar, its pins and the sheets suspended thereon, towards the carriage pins. A further object is to provide storage apparatus including a plurality of rack bars slidably supported on a pair of rails, each rack bar having a plurality of pins upon which correspondingly perforated sheets are suspended; the rack bars being of sheet metal and of inverted channel form with the pins welded to the outer face of one leg of the channel, the other leg of the channel being of shorter length to clear the pins of an adjacent rack bar, whereby a maximum number of rack bars may be stored on supporting rails of a given length.

These and other objects and the advantages of the invention will be apparent from the following specification when taken with the accompanying drawing in which:

Fig. 1 is a fragmentary plan view of storage apparatus embodying the invention, the view showing the transfer carriage in open position and a single empty rack bar;

Fig. 2 is a transverse section, on a larger scale, taken on the plane of section line 2—2 of Fig. 1 and looking in the direction indicated by the arrows; the rocking cross bar being shown in open position and with an empty rack bar thereon;

Fig. 3 is a fragmentary sectional view as seen from the rear of the storage apparatus, and showing a portion of an empty rack bar on the supporting rails; and Fig. 4 is a fragmentary sectional view, similar to Fig. 2, but showing the rocking frame in raised position with an opened rack bar file on the transfer carriage.

In the drawing, the reference numerals 1, 1 identify the side supporting rails of a storage device which may be housed in a cabinet, not shown, or which may be rigidly secured to a wall or bracket and not enclosed. The rails are of channel form with relatively long outer legs 1' and shorter inner legs 2 which constitute slideways for the supporting plates 3 of a plurality of files in the form of rack bars 4 having pins 5 welded or otherwise secured thereto for the hanging support of sheets 6 which may be maps, drawings, blueprints, photographs or the like. The sheets are perforated along one edge at a standard spacing corresponding to the spacing of the supporting pins. The rack bars 4 are relatively long for the storage of large size sheets, but smaller sheets may be supported on the pins 5 in separate groups or interleaved with sheets of maximum size. The file or assembly of sheets 6 on each rack bar is secured against inadvertent displacement by a perforated strip 7 which is slipped over the pins 5 and locked in place by spring clips, resilient washers or the like, not shown.

As best shown in Figs. 2 and 4, each rack bar 4 is of sheet metal or inverted asymmetrical channel form with the pins 5 projecting forwardly from the longer leg 4'. The rearward leg 4" is relatively short to permit the pins 5 of one rack bar to extend under the adjacent rack bar, thereby eliminating dead space and providing storage for a maximum number of rack bars in a cabinet or rack of any given size.

The series of sheets 6 on any one rack bar usually relate to the same subject matter or project and, for convenience in the location and removal of any one sheet, should be filed in some preselected order. Any sheet which is removed from a file for study, correction or replacement by a substitute sheet, should be returned to its appropriate place in the file. It is therefore necessary to remove one or more sheets from the supporting pins 5 when any intermediate sheet is to be removed from or replaced in a file. The invention provides a simple and easily operated apparatus for supporting the sheet or sheets which must be temporarily removed from a rack bar file for access to some intermediate sheet.

A transfer carriage to which a rack bar file may be lifted and opened is slidably supported on the outer legs 1' of the rails 1 and comprises end frames 8, 8 rigidly connected by a transverse bar 9 of inverted channel form. The end frames 8 have lateral flanges 10 at the outer sides of the rail legs 1' which guide the carriage for sliding movement on the rails 1 and into appropriate position with respect to a selected rack bar 4. A frame of inverted U-form, comprising a cross bar 11 and supporting arms 12 is supported for rocking movement by shafts 13 rigidly connected to the arms 12 and journalled in the respective end frames 8, 8 of the transfer carriage. The cross bar 11 is of such thickness that the channel form rack bars 4 may snugly fit over the cross bar, as shown in Fig. 2. One of the shafts 13 has fixed thereto a lever arm 14 which is slotted at its outer end to receive a roller 15 on one end of a bell-crank lever 16 which is journalled on an end frame 8 by a pivot pin 17. A ball or knob 18 is mounted on the other end of the bell-crank lever 16 for convenient manual operation of the bell-crank lever.

A series of horizontally arranged supporting pins 19 complementary to the pins 5 of a rack bar are slidably supported on the transverse bar 9 of the carriage. Coiled springs 20 bear against stop pins 21 transversely set in the pins 19 and press the pins 19 rearwardly, i. e. towards the rocking frame and a rack bar supported on the same. The ends of the supporting pins 5 of the rack bars are preferably conical, as shown, to facilitate the placement of perforated sheets on the pins 5, and the outer ends of the pins 19 of the carriage are correspondingly conically recessed to receive the conical ends of the pins 5. The cross bar 11 of the rocking frame has guide pieces 22 at each end which center a rack bar 4 on the frame to aline the supporting pins 5 of the rack bar with the complementary pins 19 of the carriage.

The transfer carriage rests upon but is not mechanically connected to the side rails of the supporting frame, and the carriage may be lifted from one set of side rails and placed upon another in large filing systems having several sets of side rails and associated rack bars.

When a rack bar file is to be opened to insert or to remove a sheet, the transfer carriage is moved along the side rails to position the rear edges of the carriage side frames (the left edge as seen in Fig. 2) approximately in transverse alinement with the desired rack bar 4, and the rocking frame 11, 12 is turned into open position by pulling lever 16 forwardly, as shown in Fig. 2. The rack bar 4 is lifted from the rail flanges 2 and lowered into place upon the cross bar 11 of the rocking frame. The cross bar is tilted rearwardly in its open position, and the supporting pins 5 of the lifted rack bar 4 are therefore upwardly inclined. If a new sheet is to be added at the front of the file, the lock strip 7 is removed, the sheet is slipped upon the pins 5, and the lock strip is again placed upon the pins.

In the more usual case, however, a sheet 6', see Fig. 4, is to be removed from or inserted at an intermediate point in a file. In such event, the lever 16 is pushed rearwardly (counterclockwise as viewed in Fig. 4) to lift the rocking frame and bring the supporting pins 5 of the file assembly into mating alinement with the set of pins 19 of the transfer carriage. The lock strip 7 and all sheets in front of the desired sheet 6' may then be moved forwardly upon the pins 19, thereby leaving the desired sheet 6' as the forward sheet of the group remaining on the pins 5. The rocking frame is moved to open position by pulling lever 16 forwardly, the sheet 6' is removed, and the rocking frame is again closed. The forward group of sheets 6 and the lock strip 7 are moved back into position on the pins 5, the rocking frame is opened, and the file is lifted from the cross bar 11 and returned to its original position on the rails 2, 2.

Particular attention is called to the mechanical linkage formed by the manually operated lever 16 and the rocking frame. The lever 16 is turned counterclockwise through about 90° to move the rocking frame through about one-fourth of that angle in its travel from open position as shown in Fig. 2, to the closed position which is illustrated in Fig. 4. Furthermore, the rates of angular displacement of lever 16 and the rocking frame are not linearly related since the roller 15 on the shorter arm of the lever 16 moves approximately at right angles to lever arm 14 of the rocking frame at the initiation of a closing movement of the rocking frame, but moves at only a small angle to the lever arm 14 towards the end of the closing movement. The practical significance of this linkage is that, if the knob 18 of the lever 16 is pressed rearwardly from the Fig. 2 position at a constant rate, the rocking frame will first be quickly lifted to bring the conical tips of the supporting pins 5 into approximately horizontal alinement with the axes of the carriage pins 19, and the rate of angular displacement of the rocking frame will decrease progressively as it moves into completely closed position. A relatively large angular displacement of the operating knob 18 is therefore required to effect a small displacement of the rocking frame into closed position, and therefore a relatively light pressure on the knob 18 will force the pins 5 into engagement with the carriage pins 19 under a relatively heavy pressure which will correct any inadvertent misalinement of a pair of complementary pins.

The springs 20 which urge the pins 19 rearwardly may therefore be relatively heavy or strong. The complementary sets of pins 5 and 19 are, of course, of the same diameter and, when so engaged under heavy pressure, will aline accurately in spite of minor mechanical variations which cannot be avoided in commercial manufacture of the equipment. It is to be noted that the high pressure engagement of the sets of pins 5 and 19 cannot result in an inadvertent movement of the rocking frame into open position since, with the rocking frame closed as shown in Fig. 4, the pressure imposed upon the roller 15 of the lever 16 by the lever arm 14 of the rocking frame is substantially "dead center," i. e. the line of pressure passes through or approximately through the pivot 17 of the lever 16 and cannot develop a couple of sufficient magnitude to throw the lever 16 clockwise to open the rocking frame.

The invention is not limited to the particular embodiment herein shown and described. For maps, drawings or other sheets of great size, it may be advisable to provide manually operated levers 16 at both sides of the carriage for lifting a selected rack bar file. This and other modifications which may occur to those familiar with the art fall within the spirit and scope of the invention as set forth in the following claims.

I claim:

1. A transfer apparatus for use with apparatus for the suspension storage of sheets on a plurality of files carried by an independently movable on and removable from a pair of side rails, each file comprising a rack bar having means at the ends thereof for supporting the same upon the respective side rails and being provided with pins to receive and support sheets which are to be stored; said transfer apparatus comprising a carriage and means for supporting the same above the files of the suspension storage apparatus, said carriage including a pair of spaced end frames and a transverse member connecting the same, a set of pins carried by said transverse member and complementary to the pins of the file rack bars, a supporting frame including a cross-bar to which the rack bar of a selected file may be lifted and supported, means for mounting said supporting frame upon said end frames for movement to an open position in which a selected file may be lifted into position on or removed from said cross-bar or alternatively to a closed position in which the pins of a selected file supported on said cross-bar aline with and contact the pins of said transverse member to provide a support for the sheets carried by said selected file, and means comprising a manually operable member for moving said supporting frame between said alternate positions, said cross bar being rearwardly inclined when said supporting frame is moved into open position to receive the rack bar of a selected file, whereby the pins of a rack bar supported on said cross bar are upwardly inclined in the open position of said supporting frame.

2. The invention as recited in claim 1, wherein the supporting frame includes a slotted lever arm, and said manually operable means comprises a bell-crank lever having a roller on one arm and positioned within the slotted end of said lever arm of the supporting frame.

3. The invention as recited in claim 2, wherein the slotted lever arm of the supporting frame and the roller-bearing arm of the bell-crank lever are so arranged that the roller engages the slotted lever arm at a progressively decreasing angle upon movement of said bell-crank lever to move said supporting frame from open to closed position.

4. In apparatus for the suspended storage of sheets, the combination with a pair of carrying rails, and a plurality of files supported on said carrying rails, each file including a sheet metal rack bar of inverted asymmetrical U-form provided on the forward face of the longer side thereof with a forwardly projecting set of pins for receiving and supporting sheets to be stored and support means at each end of the rack bar for engagement with the respective carrying rails: of transfer apparatus for supporting a selected file which is to be opened, said transfer apparatus comprising a carriage having side members and means thereon to support said carriage on said carrying rails for movement over files supported upon said rails, a set of pins on said carriage and complementary to the pins of a file, a rocking frame comprising a file-supporting transverse bar having a transverse cross-section complementary to the interior of the U-form rack bar of a file supported on said side members and movable from an open position in which a selected file may be lifted from said rails and supported on said transverse bar to an alternative position in which the set of pins of the selected file aline axially with and contact the pins on said carriage, and manually operable means on said carriage for moving said rocking frame from one to the other of its alternative positions, the forward face of said transverse bar being rearwardly inclined when the rocking frame is in open position, whereby the pins of a file supported on said transverse bar are upwardly inclined in the open position of the rocking frame.

5. The invention as recited in claim 4, in combination with guide means at the opposite ends of and extending above said transverse bar to position a file supported thereon with its pins alined laterally with the pins on said carriage.

6. The invention as recited in claim 4, wherein said rocking frame includes a slotted lever arm, and said manually operable means comprises a bell-crank lever having a roller on one arm and positioned within said slotted end of said lever arm of the rocking frame.

7. The invention as recited in claim 6, wherein the slotted lever arm of the rocking frame and the roller-bearing arm of the bell-crank lever are so arranged that the roller engages the slotted lever arm at a progressively decreasing angle upon movement of said bell-crank lever to move said rocking frame from open to closed position.

8. In apparatus for the suspended storage of sheets, the combination with a pair of carrying rails, and a plurality of files supported on said carrying rails, each file including a rack bar of inverted asymmetrical U-form in cross-section with a forward long leg and a rearward short leg integrally connected by a web, a set of pins projecting forwardly of the front face of the long leg of the rack bar for receiving and supporting sheets to be stored, and support means at each end of the rack bar for engagement with the respective carrying rails, said support means extending forwardly of the front face of the rack bar to engage the short leg of an adjacent file to determine the minimum spacing of the files on said carrying rails, said pins of each file projecting forwardly from the front face of the long leg of the rack bar to telescope beneath the short leg of the adjacent rack bar in the minimum spacing of said files on said carrying rails; of transfer apparatus for supporting a selected file to be opened, said transfer apparatus comprising a carriage having side members and means thereon to support said carriage on said carrying rails for movement over files supported upon said rails, a set of pins on said carriage and complementary to said set of pins of a file, a rocking frame supported on said side members and movable from an open position in which a selected file may be lifted from said rails and supported on said frame to an alternative position in which said set of pins of the selected file aline axially with and contact the pins on said carriage, and manually operable means on said carriage for moving said rocking frame from one to the other of its alternative positions.

9. A transfer carriage for use with apparatus for the suspended storage of sheets on files each comprising sets of pins secured to a rack bar slidably supported on a pair of side rails; said transfer carriage comprising end frames provided with means to support the carriage for movement on the side rails, a transverse member rigidly connecting said end frames, a set of pins slidably supported on said transverse member and complementary to the set of pins of the file rack bars, a frame supported on said carriage and movable from an open position in which the rack bar of a selected file may be lifted from said rails and supported on said frame into an alternative closed position in which the set of pins of the supported rack bar aline with the set of pins on the transverse member of the carriage, spring means yieldingly urging the pins of the set supported on the transverse member towards the pins of a rack bar supported on said frame, and manually operable means on said carriage for moving said frame from one to the other of its alternative positions.

References Cited in the file of this patent

UNITED STATES PATENTS

| | | |
|---|---|---|
| 1,134,616 | Johanson | Apr. 6, 1915 |
| 1,229,552 | Wagner | June 12, 1917 |
| 2,111,932 | Kenedy | Mar. 22, 1938 |
| 2,136,168 | Kern | Nov. 8, 1938 |
| 2,256,678 | Kern | Sept. 23, 1941 |
| 2,519,192 | Lincke | Aug. 15, 1950 |
| 2,623,526 | Page | Dec. 30, 1952 |

FOREIGN PATENTS

| | | |
|---|---|---|
| 79,475 | Switzerland | 1918 |